(12) United States Patent
Agapiou et al.

(10) Patent No.: US 10,879,752 B2
(45) Date of Patent: Dec. 29, 2020

(54) LOW POROSITY AND CONSISTENT METALLURGICAL BONDING FOR HYBRID MOTOR ROTORS

(71) Applicant: GM Global Technology Operations LLC, Detroit, MI (US)

(72) Inventors: John S. Agapiou, Rochester Hills, MI (US); Hongliang Wang, Sterling Heights, MI (US); James G. Schroth, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/297,010

(22) Filed: Mar. 8, 2019

(65) Prior Publication Data
US 2020/0287429 A1 Sep. 10, 2020

(51) Int. Cl.
| | | |
|---|---|---|
| *H02K 17/16* | (2006.01) |
| *H02K 1/26* | (2006.01) |
| *H02K 3/12* | (2006.01) |
| *H02K 1/02* | (2006.01) |
| *H02K 15/02* | (2006.01) |
| *H02K 15/06* | (2006.01) |
| *H02K 3/48* | (2006.01) |

(52) U.S. Cl.
CPC .............. *H02K 1/265* (2013.01); *H02K 1/02* (2013.01); *H02K 3/12* (2013.01); *H02K 3/48* (2013.01); *H02K 15/024* (2013.01); *H02K 15/063* (2013.01)

(58) Field of Classification Search
CPC .. H02K 17/165; H02K 17/185; H02K 17/285; H02K 17/16; H02K 17/18; H02K 17/20
See application file for complete search history.

(56) References Cited

U.S. PATENT DOCUMENTS

| | | | | |
|---|---|---|---|---|
| 2,292,167 A | * | 8/1942 | Smith | 310/212 |
| 2,324,728 A | * | 7/1943 | Schiff | 310/211 |
| 2,370,458 A | * | 2/1945 | Goran | 310/211 |
| 2,386,138 A | * | 10/1945 | Pancher | H02K 17/165 310/211 |
| 3,488,532 A | * | 1/1970 | Anderson | H02K 3/24 310/58 |
| 3,496,397 A | * | 2/1970 | Andresen | H02K 17/185 310/212 |
| 6,246,141 B1 | * | 6/2001 | Bailey | H02K 17/205 310/211 |
| 6,772,504 B2 | * | 8/2004 | Weidman | H02K 1/32 29/598 |
| 8,963,394 B2 | * | 2/2015 | Buttner | B22D 19/0054 310/211 |

\* cited by examiner

*Primary Examiner* — Dang D Le (57) ABSTRACT

A rotor stack assembly includes multiple plates each including multiple elongated slots each oriented radially outward from a longitudinal central axis of each plate toward an outer perimeter wall of the plate. Multiple openings are each positioned proximate to one of the slots and directed outwardly through the outer perimeter wall. Multiple runners individually extend through the plate and individually open into one of opposed ends of each of the slots. Multiple bars of a conductive material are each extended through aligned ones of the slots of each of the multiple plates.

14 Claims, 6 Drawing Sheets

LOW POROSITY AND CONSISTENT METALLURGICAL BONDING FOR HYBRID MOTOR ROTORS

The present disclosure relates to electrical motors and a system and method for mitigating porosity issues in motor rotors formed using aluminum casting methods.

Motor rotors may be manufactured using permanent magnet material, however the cost and availability of permanent magnet material is prohibitive for large volume manufacture of automobile motors. As a reduced cost alternative, multiple metal plates, made for example from steel are stacked together. The plates each have multiple slots which align with each other when the plates are stacked to form a rotor plate stack. Individual bars of copper material are inserted through the aligned slots of the stack. The stack is then placed in a mold and an aluminum material is cast about the stack and forced under pressure into the slots and about the copper bars.

The number of gates available to expel air and gas from the mold is significantly less than the quantity of bars and a quantity of the slots of the plates. The current copper-aluminum (Cu—Al) hybrid rotor casting process therefore results in substantial quantities of rejected assemblies caused by high porosity and inconsistent Cu—Al bonds which are due in part to the inability to expel air and gas which are carried into the mold as the molten aluminum is forced through the mold. A post-machining process for aluminum runner removal is also required.

Thus, while current Cu—Al hybrid rotors achieve their intended purpose, there is a need for a new and improved system and method for casting Cu—Al hybrid rotors.

SUMMARY

According to several aspects, a rotor stack assembly includes multiple plates each including multiple elongated slots each oriented radially outward from a longitudinal central axis of each plate toward an outer perimeter wall of the plate. Openings in each plate are each positioned proximate to one of the slots and are directed outwardly through the outer perimeter wall. Multiple runners individually extend through each plate and individually open into one of opposed ends of each of the slots. Multiple bars of a conductive material each extend through aligned ones of the slots of the multiple plates.

In another aspect of the present disclosure, a maximum width of each of the bars is substantially equal to a diameter of each of the runners.

In another aspect of the present disclosure, the runners have a non-circular shape defining a clearance size, and a maximum width of each of the bars is substantially equal to the clearance size of each of the runners.

In another aspect of the present disclosure, the runners between successive plates are coaxially aligned to create multiple axially aligned passages from end-to-end of the rotor stack.

In another aspect of the present disclosure, the runners between successive plates are aligned to create multiple aligned passages from end-to-end of the rotor stack, the aligned passages being skewed by torsionally skewing the multiple plates.

In another aspect of the present disclosure, each of the runners open into the one of the opposed ends of each of the slots positioned at an inward end of each of the slots and oppositely about each slot with respect to the opening.

In another aspect of the present disclosure, each of the runners open into the one of the opposed ends of each of the slots positioned at radially outward ends of each of the slots and also open into the opening directed outwardly through the outer perimeter wall.

In another aspect of the present disclosure, a central aperture extending through each of the plates; and a rotor arbor inserted through the central aperture of each of the plates.

In another aspect of the present disclosure, a land of solid plate material is retained between successive ones of the slots with each land having a predetermined width. Each of the slots is substantially equally spaced from a successive one of the slots.

In another aspect of the present disclosure, a radial spacing is fixed between any two successive ones of the slots and between any two successive ones of the runners of each plate.

In another aspect of the present disclosure, the bars are shaped to match a geometry of the slots, each having a first end positioned at a radially outward end of the aligned ones of the slots and a second end narrower than the first end positioned at a radially inward end of the aligned ones of the slots.

According to several aspects, a molded rotor stack assembly includes multiple metal plates each including multiple elongated slots each oriented radially outward from a longitudinal central axis of each plate toward an outer perimeter wall of each plate. Multiple openings in each plate are individually positioned proximate to one of the slots and are directed outwardly through the outer perimeter wall. Multiple runners in each plate each extend through the plate and individually open into at least one of opposed ends of each of the slots. The runners between successive plates are aligned to create multiple aligned passages from end-to-end of the rotor stack. Multiple bars of a conductive material are each extended through aligned ones of the slots of each of the multiple plates. An aluminum material is forced in molten form into each of the multiple aligned passages to extend through the multiple aligned passages to each of the plates and from each of the multiple aligned passages radially outwardly into each of the slots to surround the bars positioned in each of the slots.

In another aspect of the present disclosure, the runners between successive plates are aligned to create multiple aligned passages from end-to-end of the rotor stack, providing transfer of the aluminum material to each of the plates.

In another aspect of the present disclosure, a shape of the bars matches a shape of the slots.

In another aspect of the present disclosure, individual ones of the runners open into the at least one of the opposed ends of each of the slots positioned at both an inward end and an outward end of each of the slots.

In another aspect of the present disclosure, the runners open into the at least one of the opposed ends of each of the slots positioned at an inward end of each of the slots.

In another aspect of the present disclosure, the runners open into the at least one of the opposed ends of each of the slots positioned at an outward end of each of the slots proximate to the outer perimeter wall.

According to several aspects, a method for molding a rotor stack assembly includes: forming multiple steel plates by stamping multiple elongated slots into each of the plates each oriented radially outward from a longitudinal central axis of each plate toward an outer perimeter wall of each plate; positioning multiple openings in the plates each proximate to one of the slots and each directed outwardly through the outer perimeter wall; and creating multiple runners extending through each plate with each individually opening into one of opposed ends of each of the slots; aligning the plates such that each of the runners between successive plates is aligned with one of the runners of a successive plate to create multiple aligned passages from end-to-end of the rotor stack; inserting multiple bars of a conductive material through the aligned ones of the slots of each of the multiple plates; and injecting a molten aluminum material into each of the multiple aligned passages to extend through the multiple aligned passages to each of the plates and from each of the multiple aligned passages radially outwardly into each of the slots to surround the bars positioned in each of the slots.

In another aspect of the present disclosure, the method includes positioning the runners such that the runners open into the one of the opposed ends of each of the slots at an inward end of each of the slots.

In another aspect of the present disclosure, the method includes positioning the runners such that the runners open into the one of the opposed ends of each of the slots at an outward end of each of the slots.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
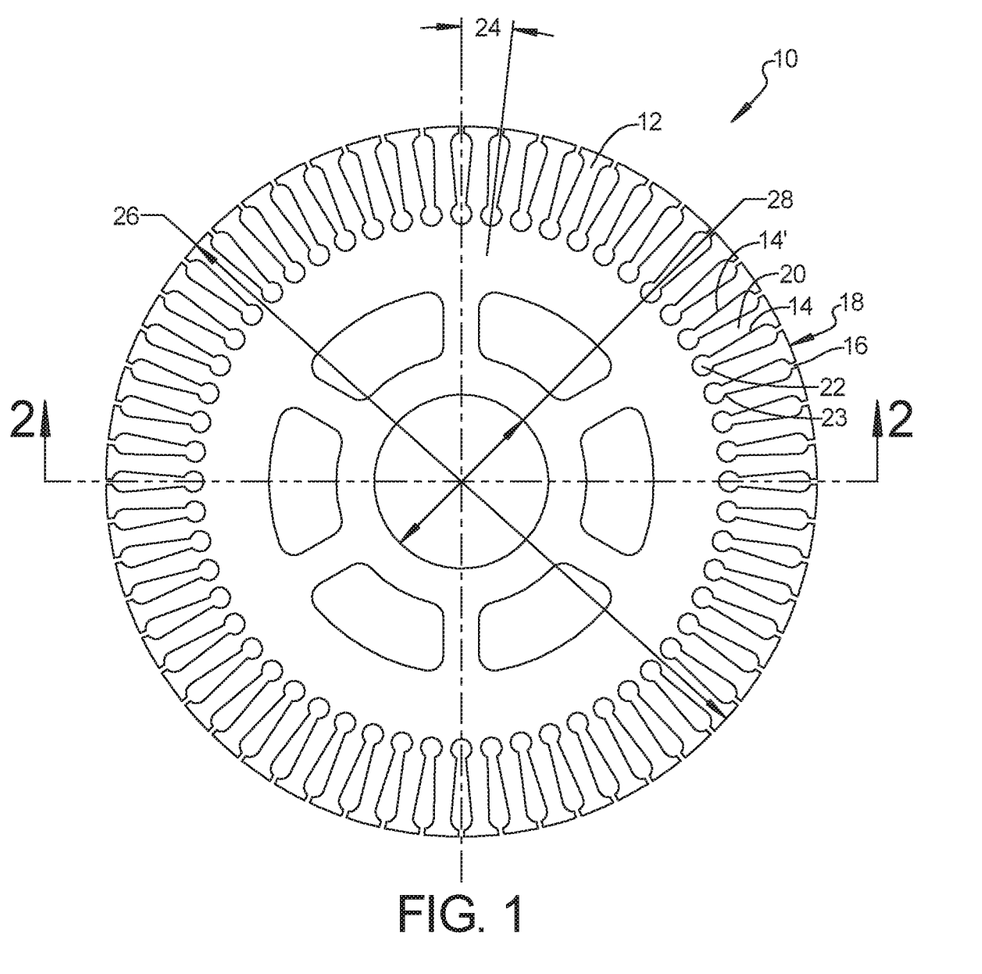
FIG. 1 is a top plan view of a single plate of a rotor stack plate assembly according to an exemplary aspect.

Referring to FIG. 1, a rotor stack 10 is formed by stacking multiple metal lamination plates 12 on top of each other. According to several aspects the plates 12 are made of steel for example by a stamping operation, but other material may also be used. The rotor stack 10 contains a predetermined quantity of the metal plates 12, and according to one exemplary aspect approximately two hundred plates 12 are provided. The quantity of metal plates 12 can vary at the discretion of the designer to achieve a motor operating performance desired. Each of the plates 12 has multiple elongated cavities or slots 14 oriented in a radial pattern directed outwardly from a longitudinal central axis 15 of each plate 12 of the rotor stack 10, which are positioned proximate to and open outwardly through an opening 16 which can be located at an outer perimeter wall 18 of each of the plates 12. According to several aspects each opening 16 is narrower than a width of the associated slot 14 or has a width equal to or larger than a width of the associated slot 14. According to several aspects the opening 16 is omitted. A land 20 of solid plate material is retained between all successive ones of the slots such as between a first slot 14 and a proximate one of the slots 14', with each land 20 having a predetermined width.

To increase a flow rate of molten aluminum material through the rotor stack 10 during subsequent addition of casting material through the rotor stack 10, a hole defining a runner 22 is created and opens at an inward end 23 of each of the slots 14 and therefore is positioned oppositely about each slot 14 with respect to the opening 16 associated with each slot 14. According to several aspects each of the runners 22 defines a circular shape, however other geometric shapes can also be used such as but not limited to oval, square, rectangular, and the like. To assemble the rotor stack 10, multiple ones of the plates 12 are stacked in a face-to-face configuration on top of each other, with each one of the slots 14 aligned with a successive one of the slots (not shown in this view) of the successive plates 12. This stacking process also aligns the runners 22 of successive ones of the plates 12. A radial spacing 24 is fixed during stamping of the plates 12 between any two successive ones of the slots 14 and between any two successive ones of the runners 22 of each plate 12 to ensure alignment of the slots 14 between the plates 12 when the plates 12 are stacked. According to several aspects every second, third or fourth one of the slots 14 shown in FIG. 1 may be omitted, resulting in a corresponding increase in the radial spacing 24 between the wider spaced slots 14. A quantity of the plates 12 used for the rotor stack 10 and a fixed diameter 26 of each of the plates 12 is predefined by the designer and can vary between different rotor stack designs. According to several aspects the diameter 26 is approximately 97 mm, and according to further aspects can range from approximately 50 mm up to approximately 200 mm inclusive. A central aperture 28 is also created in each of the plates 12 which receives a rotor arbor shown and described in greater detail in reference to FIGS. 3 and 4.

Figure 2:
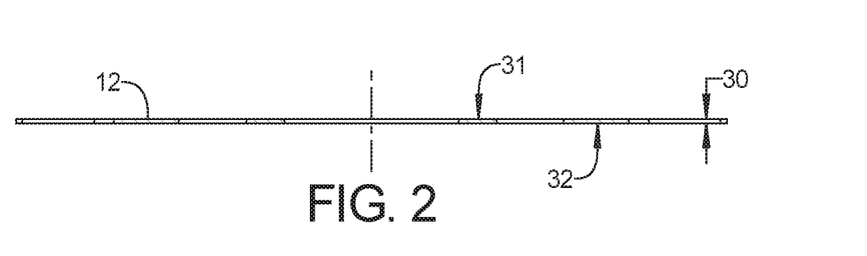
FIG. 2 is a side elevational view of the plate of FIG. 1.

Referring to FIG. 2 and again to FIG. 1, each of the plates 12 has a common plate thickness 30. According to one exemplary aspect, the plate thickness 30 is approximately 0.35 mm, however the plate thickness 30 can range between approximately 0.2 mm to 1.0 mm. Each of the plates 12 have parallel opposed faces 31, 32 that are flat or planar to allow face-to-face and plate-to-plate stacking with minimal deflection between successive plates, which mitigates against formation of open gaps between any two successive ones of the plates 12.

Referring to FIG. 3 and again to FIG. 1, the rotor stack 10 has a predetermined stack height 33 which is a function of the plate thickness 30 and a quantity of the plates 12. As previously noted, as the plates 12 such as exemplary plates 12, 12', 12" are stacked in face-to-face contact with each other, successive alignment of the slots 14 is maintained between the plates 12. Multiple bars 34, each made for example of a conductive material such as copper are then slidably inserted through aligned ones of the successive slots 14 of the stacked plates 12, for example in an installation direction 36. The bars 34 are shaped to closely match a shape of the slots 14 such that aligned slots 14 of successive plates 12 such as between plate 12 and plate 12' are substantially filled by the bars 34. According to several aspects, a maximum width 35 of each of the bars 34 is substantially equal to a passage size 37 such as a diameter of each of the runners 22 if the runners 22 are circular in shape or is substantially equal to a comparable passage size 37 of each of the runners 22 if the runners are non-circular in shape such as oval or rectangular-shaped. Installation of the bars 34 through all of the successively stacked plates 12 of the rotor stack 10 maintains alignment of the runners 22 of each successive plate 12. According to several aspects, the runners 22 between plates 12 are coaxially aligned to create multiple axially aligned passages from end-to-end of the rotor stack 10. According to other aspects the combined passages defined by the aligned runners 22 may be skewed if the plate-to-plate alignment is torsionally skewed as described below.

Figure 3:
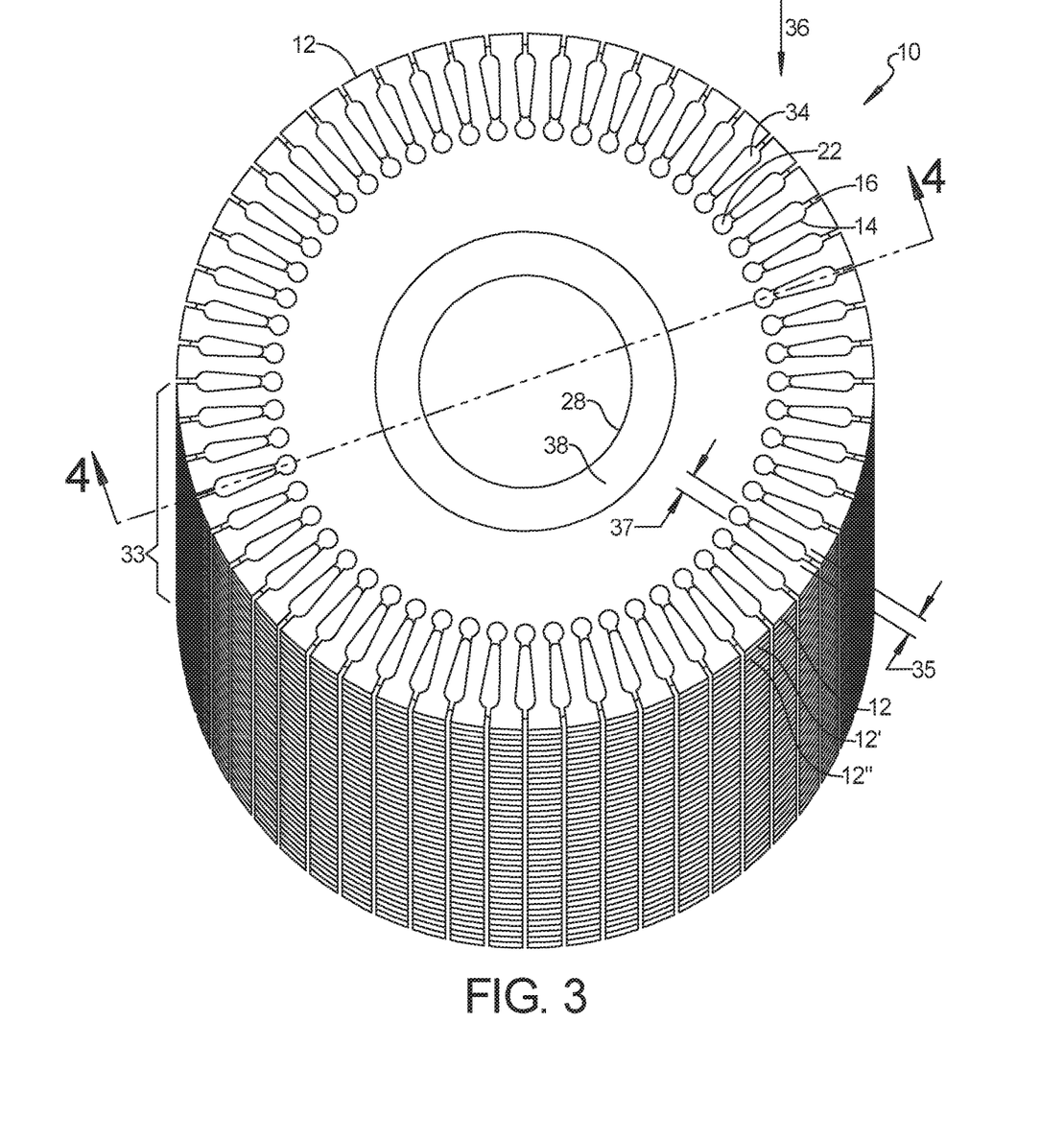
FIG. 3 is a top perspective view of an assembled rotor stack plate assembly having multiple plates similar to the single plate of FIG. 1 according to an exemplary aspect.

A quantity of the bars 34 is not limiting but the quantity of bars 34 may impact or be impacted by a quantity of and size of the runners 22. According to one exemplary aspect, the rotor stack 10 includes fifty-six (56) bars 34, and the runners 22 may each have a diameter of approximately 2.5 mm. To maintain a structural integrity of the plates 12, the designer can choose to increase the diameter of the runners 22 if fewer bars 34 are used or decrease the diameter of the runners 22 if more bars 34 are used. After installation of the bars 34 the rotor stack 10 can be torsionally skewed if desired before placement in the die and pressurized injection of a molten aluminum. A rotor arbor 38 is also inserted through the coaxially aligned central apertures 28 of the stacked plates 12 and may be frictionally retained or fixed at the time of molten aluminum injection as will be described below.

Referring to FIG. 4 and again to FIGS. 1 and 3, the rotor stack 10 with the bars 34 and the rotor arbor 38 are together positioned in a die of a high-pressure injection mold (not shown for clarity), and molten aluminum is forced under pressure through the stacked plates to create a molded rotor stack assembly 40 as follows. An exemplary flow passage 42 is created by the combined alignment of multiple runners 22 of the plates 12. The pressurized molten aluminum can enter at a first end ring 44 of the rotor stack 10 through the flow passage 42, and flow through multiple flow passages similar to the flow passage 42 defined about the perimeter of the rotor stack 10 created by aligned ones of the other runners 22. The pressurized molten aluminum can also enter at the first end ring 44 via clearances between the bars 34 and the walls of each of the slots 14. The pressurized molten aluminum flows in a flow direction 46 (upwardly in the example orientation of FIG. 4) to a second end ring 48 of the rotor stack 10. The runners 22 can be sized such that flow of the pressurized aluminum can be substantially laminar through the runners 22, which mitigates entrainment of air or gas, thereby reducing potential for porosity in the finished aluminum casting.

Figure 4:
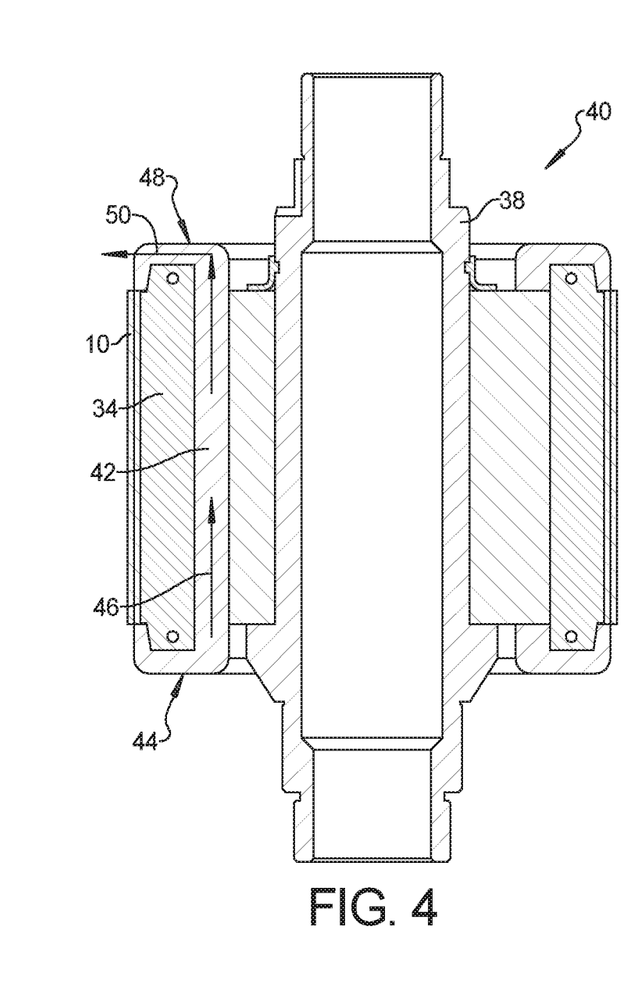
FIG. 4 is a cross sectional front elevational view taken at section 4 of FIG. 3.

At each position of a slot 14 in each of the plates 12 the pressurized molten aluminum is also forced outwardly in a radial outward direction 50 to flow through each of the slots 14, past each of the bars 34, and outwardly through each of the openings 16 of each of the plates 12. The provision of the multiple runners 22 in each of the plates 12 provides a reduced pressure drop flow path for the molten aluminum to travel from end-to-end of the rotor stack 10, for example from the first end ring 44 toward the second end ring 48. This maximizes molten aluminum flow, minimizes the time to fill the rotor stack 10, and maximizes air and entrained gas expulsion from the rotor stack 10 by overflow of the molten aluminum while the aluminum is still in its molten state, which may thereby minimize porosity in the aluminum as the aluminum cools. Minimizing porosity in the aluminum during cooling of the molten aluminum in this manner improves rotor conductivity and performance. In addition, the bonding of the aluminum second end ring 48 with the bars 34 is more consistent.

Referring to FIG. 5 and again to FIG. 4, an upper view of the molded rotor stack assembly 40 identifies an as-molded condition having an overflow ring 52, multiple gates 54 and a second end or outer ring 56. Molten aluminum reaching the outer ring 56 encircles an outwardly extending portion of the second end ring 48 and flows outwardly via the multiple overflow gates 54 to the outer ring 56. In this case, molten metal flows from the second end ring 44 through the runners 22 into the second end ring 48 by the flow direction 50 and the initial flow with the air and entrained gas keeps flowing in the overflow or outer ring 56 via the gates 54. Multiple overflow portions 58 may also be created at ports of the overflow ring 52 in the mold further allowing overflow of the molten aluminum and outflow of air and gas from the mold.

Referring to FIG. 6 and again to FIGS. 1 through 5, according to several aspects, rotor stack 60 is modified from the rotor stack 10 by use of multiple metal lamination plates 62 in place of the metal lamination plates 12. Common elements of the rotor stack 60 with the rotor stack 10 are identified using prime symbols. The plates 62 each include multiple slots 14' similar to the slots 14 and flow passages 42' similar to the flow passages 42 of the plates 12. Multiple bars 34' are individually received in aligned ones of the slots 14' similar to the bars 34. The plates 62 are modified from the plates 12 to further include multiple second runners 64 which are located at radially outward ends 65 of each of the slots 14', and which open into individual openings 66' similar to the openings 16.

Figure 5:
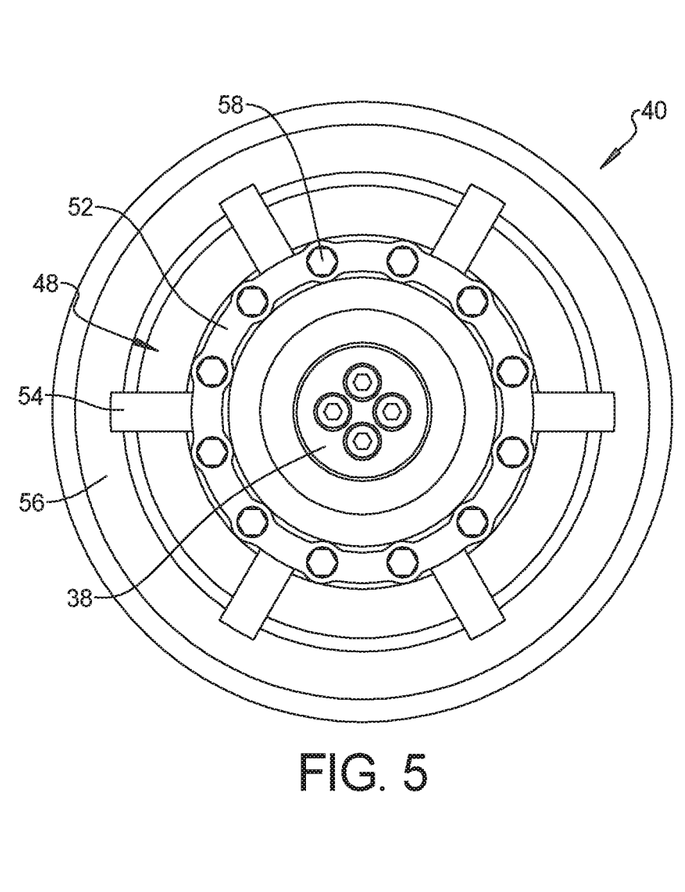
FIG. 5 is a top perspective view of the rotor stack plate assembly of FIG. 3 following a molding operation.
Figure 6:
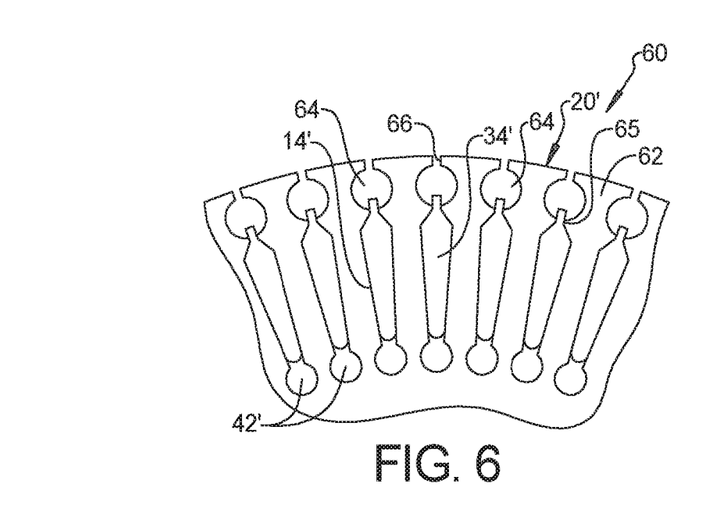
FIG. 6 is a top plan view of a portion of a rotor stack plate according to a further aspect.

Referring to FIG. 7 and again to FIGS. 4 through 6, the rotor stack 60 together with a rotor arbor 38' are positioned in a high-pressure mold (not shown) which is injected with molten aluminum under high-pressure to create a molded rotor stack assembly 68 modified from the molded rotor stack assembly 40. A flow passage 42' is provided similar to the flow passage 42, which provides an exemplary interior flow of molten aluminum in a flow direction 46' similar to the flow direction 46. The molded rotor stack assembly 68 further provides an exterior flow passage via the aligned second runners 64 in a flow direction 74. The pressurized molten aluminum enters at a first end 70 of the rotor stack 60 through the runners 22' and through the second runners 64 and flows in the flow direction 46' and the flow direction 74 toward a second end 72 of the rotor stack 60. The pressurized molten aluminum can also enter at the first end 70 via clearances between the bars 34' and the walls of each of the slots 14'.

Figure 7:
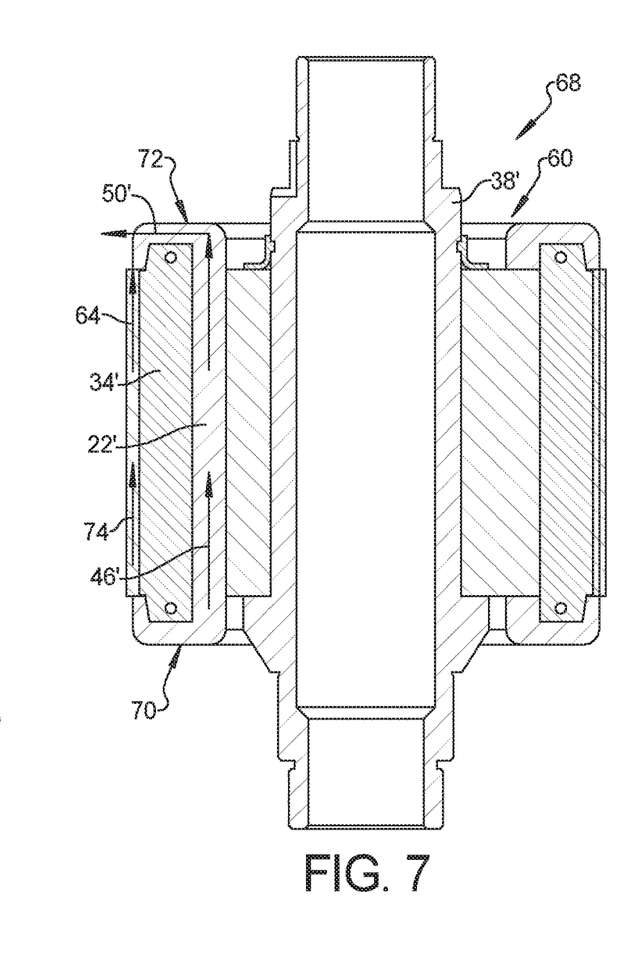
FIG. 7 is a cross sectional front elevational view similar to FIG. 3 of a rotor stack plate assembly having rotor stack plates of FIG. 6.

At each position of a slot 14' in each of the plates 62 the pressurized molten aluminum is also forced outwardly in a radial outward direction 50' to flow through each of the slots 14', past each of the bars 34', and outwardly through each of the openings 66 of each of the plates 62. The provision of the multiple runners 22' and the multiple second runners 64 in each of the plates 62 provides a further reduced pressure drop flow path for the molten aluminum to travel from end-to-end of the rotor stack 60, for example from the first end 70 toward the second end 72, which as previously described maximizes molten aluminum flow, minimizes the time to fill the rotor stack 60, and maximizes air and entrained gas expulsion from the rotor stack 60 by overflow of the molten aluminum while the aluminum is still in its molten state, which may thereby minimize porosity in the aluminum as the aluminum cools.

Figure 8:
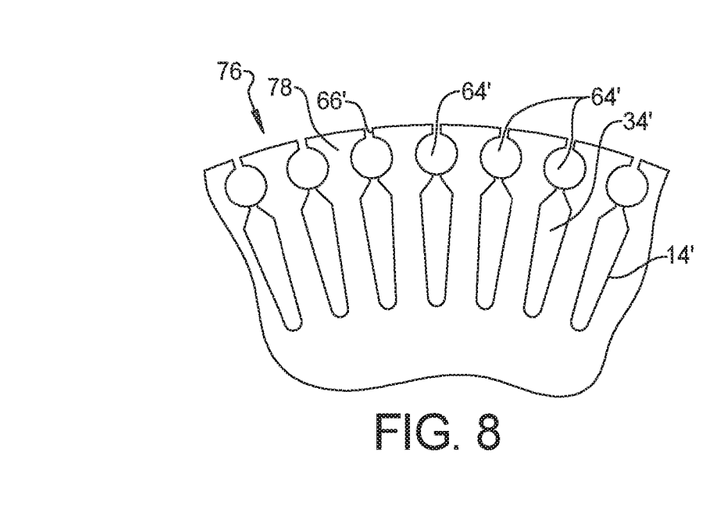
FIG. 8 is a top plan view of a portion of a rotor stack plate according to a further aspect.

Referring to FIG. 8 and again to FIGS. 1, 3, 6 and 7, according to further aspects a rotor stack 76 is modified from the rotor stack 60 by eliminating the runners 22'. Only the second runners 64' are used in this aspect. With continuing reference to FIG. 7, when the rotor stack 76 is positioned in a high-pressure mold, pressurized molten aluminum enters at the first end 70 of the rotor stack 76 only through the second runners 64' and flows in a flow direction similar to the flow direction 74 toward a second end of the rotor stack 76. The molten aluminum flows from each of the second runners 64' in each of a radial inward direction through each of the slots 14', and past each of the bars 34', and flows in a radial outward direction through each of the openings 66' of each of the plates 78.

Figure 9:
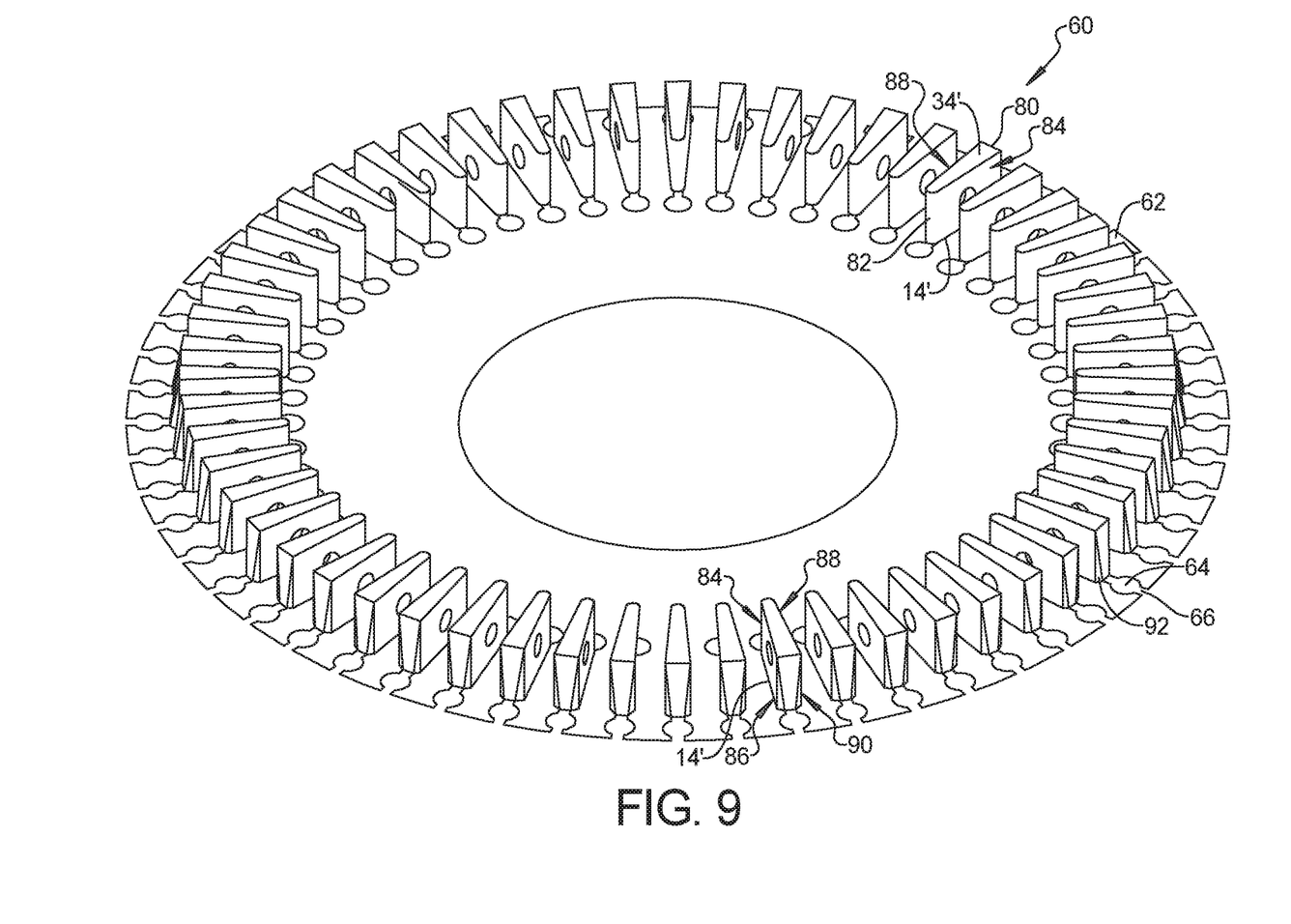
FIG. 9 is a top perspective view of the rotor stack plate of FIG. 6 during installation of conductive bars.

Referring to FIG. 9 and again to FIGS. 3 and 6, one of the plates 62 of the rotor stack 60 is shown during installation of the bars 34'. According to several aspects the bars 34 and the bars 34' are similar and have a geometric shape matching a geometric shape of the slots 14, 14', and may for example be triangular-shaped, rectangular, oval or the like, having a first end 80 normally positioned at a radially outward end of the slot 14'. A second end 82 is narrower than the first end 80 and is positioned at a radially inward end of the slot 14'. A first face 84 of each of the bars 34' contacts a first wall 86 of each slot 14' and a second face 88 of each of the bars 34' opposed to the first face 84 contacts a second wall 90 of each slot 14'. A tongue portion 92 can also be provided with each bar 34' which extends at least partially into one of the second runners 64'. In this aspect, a shape or geometry of each of the slots 14' is therefore also shaped to substantially match the shape of the bars 34, 34' and therefore may be triangular-shaped.

Referring to FIG. 10 and again to FIGS. 1, 3, and 6 through 8, according to further aspects a rotor stack 94 is modified from the rotor stack 60 by eliminating the runners located at either end of an elongated slot 96. A single bulbous-shaped, centrally positioned runner 98 is located in the center of the slot 96 and is created by outwardly extending the center walls of the slot 96 to create a first bulbous runner portion 100 on a first side of a bar 102 and a second bulbous runner portion 104 on an opposed second side of the bar 102. A bar first end 106 of the bar 102 is positioned at and in substantial contact with a first end wall 108 of the slot 96, and a bar second end 110 of the bar 102 is positioned proximate to a second end wall 112 of the slot 96. An opening 114 is located at an outer perimeter wall 116 of each of multiple plates 118 similar to the opening 16 described in reference to FIG. 1, which extends through the second end wall 112 and therefore communicates with the first bulbous runner portion 100 and the second bulbous runner portion 104.

Figure 10:
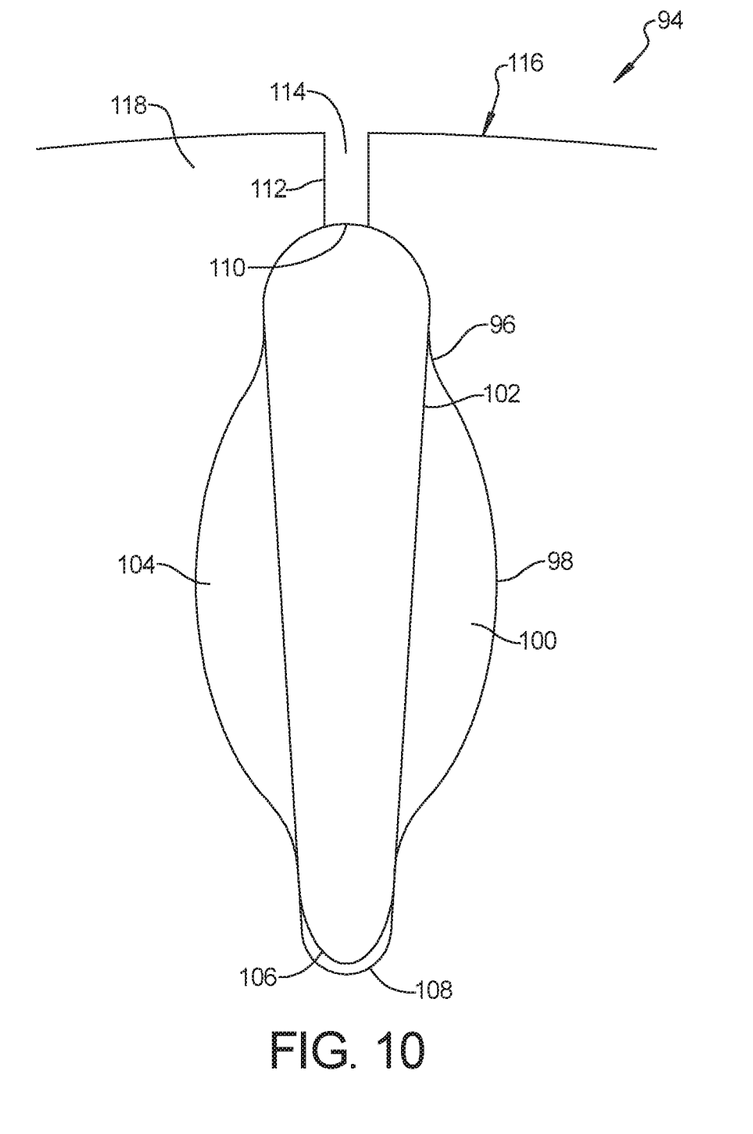
FIG. 10 is a top plan view of a portion of a rotor stack plate according to a further aspect.

When the rotor stack 94 is positioned in a high-pressure mold, pressurized molten aluminum enters at the first end of the rotor stack 94 through the first bulbous runner portion 100 of each slot 96 and also through the second bulbous runner portion 104, and flows in a combined flow direction similar to the flow directions 46 and 74 as shown in FIG. 7 (for example toward the viewer as shown in FIG. 10) toward a second end of the rotor stack 94. The molten aluminum flows around the bars 102 and fills the first bulbous runner portion 100 and the second bulbous runner portion 104 of each slot 96. The aluminum can also flow radially outwardly from the slot 96 into the through opening 114 located at the outer perimeter wall 116 of each of the plates 118 similar to the opening 16 described in reference to FIG. 1.

A molded rotor stack assembly of the present disclosure offers several advantages. These include provision of inner slots that force air and gas from an inside diameter of a laminated plate to flow radially outward to reduce porosity in a cast aluminum portion of a rotor stack assembly. These also include provision of a double-side slot design to increase consistency of bonding performance for each shorting bar. Lamination of an outer slot design eliminates external runners. A molded rotor stack assembly of the present disclosure improves casting issues of porosity, mitigates inconsistent copper-aluminum bonding and reduces or eliminates runner post-machining.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A rotor stack assembly, comprising:
multiple plates each including:
multiple elongated slots oriented radially outward from a longitudinal central axis of each plate toward a plate outer perimeter wall;
multiple first openings positioned proximate to the multiple elongated slots and directed outwardly through the outer perimeter wall;
multiple first runners located at radially inward ends of each of the multiple elongated slots extending through the plate and individually opening into the multiple elongated slots;
multiple second openings positioned proximate to the multiple elongated slots opposite to the first openings and directed inwardly into the multiple elongated slots; and
multiple second runners located at radially outward ends of the multiple elongated slots and opening into the individual second openings; and
at least one bar of a conductive material extended through aligned ones of the multiple elongated slots of each of the multiple plates.
2. The assembly of claim 1, wherein a maximum width of the at least one bar is equal to a diameter of the multiple first runners.
3. The assembly of claim 1, wherein the multiple first runners have a non-circular shape defining a clearance size, and a maximum width of the at least one bar is equal to the passage size of the multiple first runners.
4. The assembly of claim 1, wherein the multiple first runners between successive ones of the plates are coaxially aligned to create at least one axially aligned passage from end-to-end of the rotor stack.
5. The assembly of claim 1, wherein the multiple first runners between successive plates are aligned to create at least one aligned passage from end-to-end of the rotor stack.
6. The assembly of claim 1, wherein the multiple elongated slots include opposed ends and the multiple first runners are open into one of the opposed ends of the multiple elongated slots positioned at an inward end of the multiple elongated slots and oppositely about the slot with respect to the opening.

7. The assembly of claim 1, wherein the multiple elongated slots include opposed ends and the multiple first runners open into one of the opposed ends of the multiple elongated slots positioned at a radially outward end of the multiple elongated slots and also opens into the opening directed outwardly through the outer perimeter wall.

8. The assembly of claim 1, further including a rotor arbor inserted through a central aperture of the plates.

9. The assembly of claim 1, further including:
the multiple elongated slots define multiple slots;
a land defining plate material retained between successive ones of the multiple elongated slots with the land having a predetermined width; and
individual ones of the multiple elongated slots are equally spaced from a successive one of the multiple elongated slots.

10. The assembly of claim 1, wherein:
a radial spacing is fixed between any two successive ones of the slots and between any two successive ones of the runners of the plates.

11. The assembly of claim 1, wherein:
the at least one bar defines multiple bars; and
the bars are shaped to match a shape of the slots, and have a first end positioned at a radially outward end of the aligned ones of the slots and a second end narrower than the first end positioned at a radially inward end of the aligned ones of the slots.

12. A molded rotor stack assembly, comprising:
a rotor stack having multiple metal plates individually including:
multiple elongated slots oriented radially outward from a plate longitudinal central axis toward a plate outer perimeter wall;
multiple first openings individually positioned proximate to one of the slots and directed outwardly through the plate outer perimeter wall;
multiple first runners located at radially inward ends of each of the multiple elongated slots individually opening into one of opposed ends of each of the multiple elongated slots;
multiple second openings positioned proximate to the multiple elongated slots opposite to the first openings and directed inwardly into the multiple elongated slots; and
multiple second runners located at radially outward ends of each of the multiple elongated slots individually opening into a second one of the opposed ends of each of the multiple elongated slots;
the first runners and the second runners between successive plates aligned to create multiple aligned passages from end-to-end of the rotor stack;
multiple bars of a conductive material individually extended through aligned ones of the slots of the multiple plates; and
an aluminum material forced in molten form into the multiple aligned passages and extending through the multiple aligned passages to each of the plates and from each of the multiple aligned passages extending radially outwardly into the slots to surround the bars positioned in the slots.

13. The molded rotor stack assembly of claim 12, wherein the multiple first runners between successive plates are aligned to create multiple aligned passages from end-to-end of the rotor stack, providing transfer of the aluminum material to the plates.

14. The molded rotor stack assembly of claim 12, wherein a geometric shape of the bars matches an elongated shape of the slots.

* * * * *